United States Patent
Acht et al.

(10) Patent No.: US 6,543,283 B2
(45) Date of Patent: Apr. 8, 2003

(54) SENSOR FOR DETERMINING THE LEVEL AND TEMPERATURE OF A LIQUID

(75) Inventors: Joachim Acht, Frankfurt (DE); Ralf Schimmel, Weilmünser (DE); Manfred Rother, Hagen (DE); Rudolf Stiller, Niederdorfelden (DE)

(73) Assignee: Mannesmann VDO AG, Frankfurt am Main (DE)

(*) Notice: Subject to any disclaimer, the term of this patent is extended or adjusted under 35 U.S.C. 154(b) by 0 days.

(21) Appl. No.: 09/916,806

(22) Filed: Jul. 27, 2001

(65) Prior Publication Data

US 2002/0066315 A1 Jun. 6, 2002

(30) Foreign Application Priority Data

Aug. 17, 2000 (DE) .......................................... 100 40 739

(51) Int. Cl.[7] .............................................. G01F 23/04
(52) U.S. Cl. ........................ 73/295; 340/450; 340/450.3
(58) Field of Search ........................... 73/295; 340/450, 340/450.3

(56) References Cited

U.S. PATENT DOCUMENTS

| | | | | |
|---|---|---|---|---|
| 3,171,934 A | * | 3/1965 | Brennan et al. ............ | 337/370 |
| 3,922,658 A | * | 11/1975 | Harper et al. ............... | 340/622 |
| 4,313,102 A | * | 1/1982 | Boretto ...................... | 340/622 |
| 4,476,714 A | * | 10/1984 | Barry et al. ................ | 73/118.1 |
| 4,629,334 A | * | 12/1986 | Hochstein ................... | 374/103 |
| 4,638,288 A | * | 1/1987 | Remec ....................... | 340/622 |
| 4,751,845 A | | 6/1988 | Peterson et al. | |
| 4,845,469 A | * | 7/1989 | Benda ..................... | 340/450.3 |
| 5,057,813 A | * | 10/1991 | Sasaki et al. ............ | 340/450.3 |
| 5,178,009 A | * | 1/1993 | Arekapudi et al. ......... | 137/389 |
| 5,521,581 A | * | 5/1996 | Proulx ........................ | 340/449 |
| 5,900,810 A | * | 5/1999 | Park et al. ............. | 123/196 M |
| 6,237,411 B1 | * | 5/2001 | Schimmel et al. ............ | 73/295 |

FOREIGN PATENT DOCUMENTS

| | | |
|---|---|---|
| EP | 0 227 822 | 7/1987 |
| GB | 2 022 844 | 12/1979 |

* cited by examiner

Primary Examiner—Daniel S. Larkin
Assistant Examiner—André K. Jackson
(74) Attorney, Agent, or Firm—Richard A. Speer; Mayer, Brown, Rowe & Maw

(57) ABSTRACT

A sensor for determining the level and temperature of a liquid, in particular in a motor vehicle, has an elongate housing (1), in which all the components required for temperature measurement and level measurement are accommodated. This housing (1) consists of two half shells (2, 3) which rest one on the other and of which one half shell (3) has all the components required for level measurement and the wiring and resistance wire (21) necessary for this purpose and the other half shell (2) has all the components required for temperature measurement and the wiring necessary for this purpose.

5 Claims, 2 Drawing Sheets

Fig.1

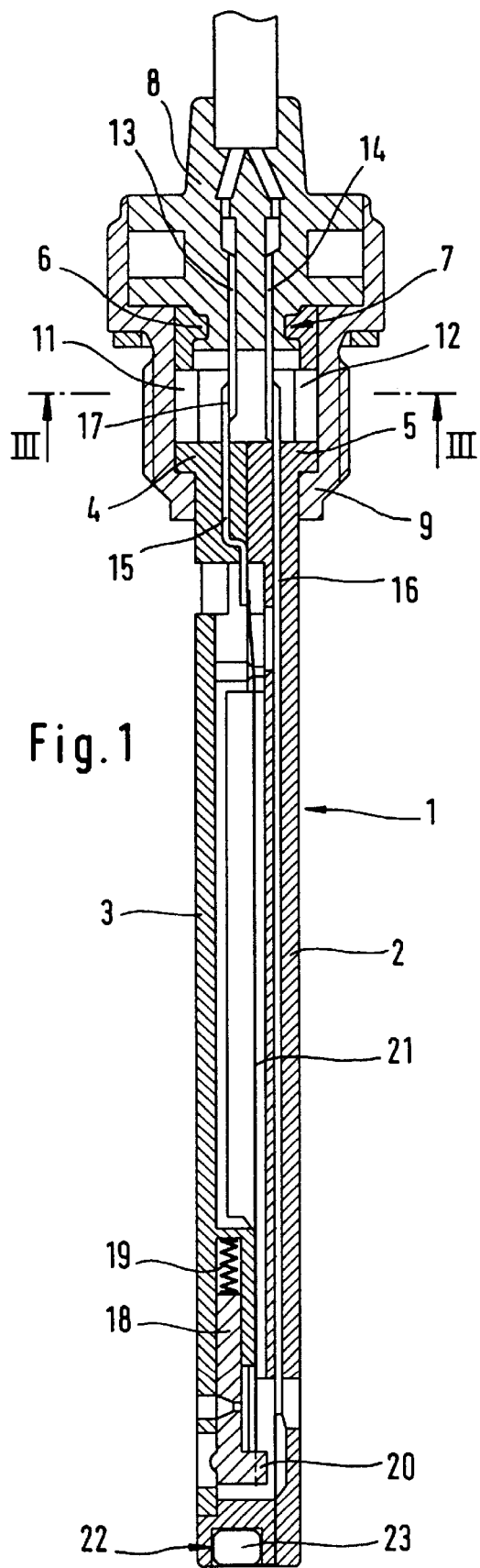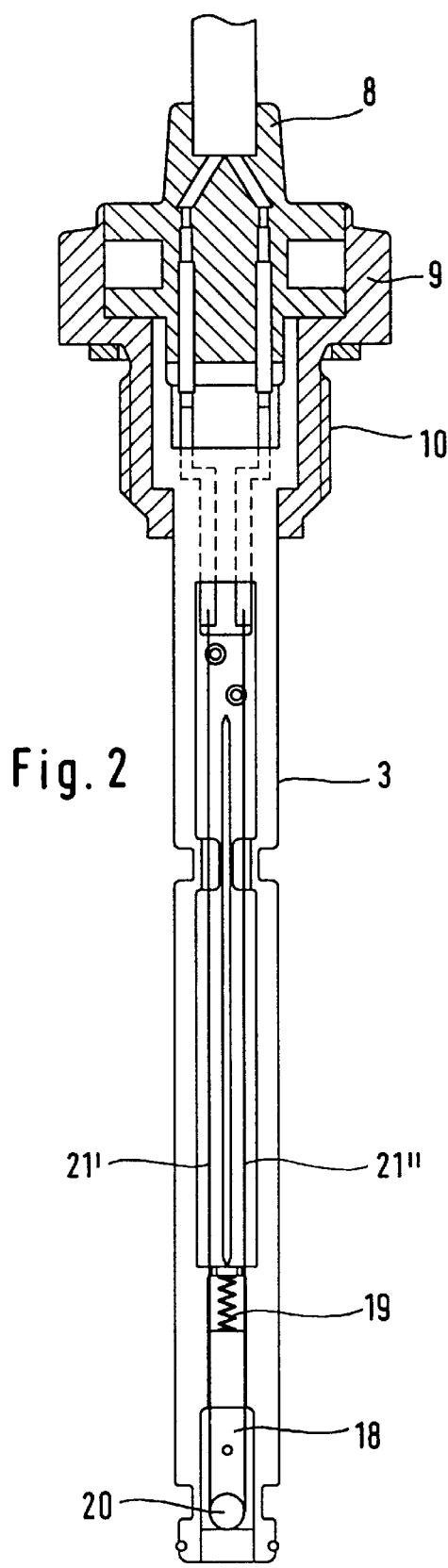

SENSOR FOR DETERMINING THE LEVEL AND TEMPERATURE OF A LIQUID

BACKGROUND OF THE INVENTION

The invention relates to a sensor for determining the level and/or temperature of a liquid, in particular in a motor vehicle, said sensor having in an elongate housing, for determining the level, a resistance wire cooled by the liquid over a region of different size as a function of the liquid level and, for determining the temperature, a sensor element responding to temperature.

Sensors of the above type are required, for example, for determining the oil level and the oil temperature in the oil sump of a motor vehicle engine and are generally known. In such sensors, the assembly of the necessary components presents difficulties. Automatic assembly has hitherto been ruled out due to the fact that the housing of the sensor is relatively long and various paths have to be fastened and wired together in it.

To make assembly easier, it is already known, in the case of a filling-level limit sensor, to form the housing from two housing halves divided in the longitudinal direction and capable of being plugged together. This construction principle could also be applied to a combined sensor for level and temperature measurement, but it would in this case be seen to be a disadvantage that a relatively large number of parts have to be arranged in the housing and obstruct one another during assembly. Furthermore, in the case of incorrect assembly, for example solely in the region of the components for level measurement, the complete sensor would in each case be useless, because, as a rule, such incorrect assemblies can be detected by measurement only when the sensor is fully assembled.

The problem on which the invention is based is to develop a sensor of the type initially mentioned for determining the level and temperature of a liquid, which can be assembled and checked in a particularly simple way.

BRIEF DESCRIPTION OF THE INVENTION

This problem is solved, according to the invention, in that the housing is formed from two half shells which rest one on the other and of which one half shell has all the components required for level measurement and the wiring and resistance wire necessary for this purpose and the other half shell has all the components required for temperature measurement and the wiring necessary for this purpose.

By virtue of this two-shell form of construction, in the first place, an operative sensor for level measurement can be mounted in one half shell and an operative sensor for temperature measurement can be mounted in the other half shell. The operativeness of the two subassemblies can be checked independently of one another, before the two half shells are connected to one another to form a cylindrical housing. The sensor according to the invention may also be used for measuring only the level or only the temperature. By virtue of the invention, it also becomes possible for the half shell for the components intended for temperature measurement to be left empty if a sensor intended to make only level measurement possible is required. In such a case, the empty half shell may serve as a fluidic damping element for the level sensor. The sensor configuration according to the invention is a modular form of construction, the two half shell modules being operative independently of one another.

To make assembly even easier, it is advantageous if the half shells have in the upper region a connection region of a larger diameter which is connected to a contact base.

The connection of the conductors leading up from the two half shells to the corresponding conductors of the contact base can be made even after the housing formed from the two half shells and the contact base have been joined together, if, according to another development of the invention, each connection region has a radial perforation and electrical conductors project both from the half shells and from the contact base into the region of these perforations and are connected to one another there.

By use of the perforations, it becomes possible for the conductors to be connected to one another, in each case by means of a weld, in the region of the perforations because a welding appliance can reach the respective connection points through said perforations.

The two half shells and the connection region are additionally secured, in the assembled state, against coming loose, if the connection region of the two half shells to the contact base is inserted into a junction piece.

The resistance wire necessary for level measurement can be laid automatically and is held positively in a tensioned position if, according to another particularly advantageous development of the invention, a tension body is arranged in the half shell for the components required for level measurement so as to be displaceable in the main direction of extent of the half shell and so as to be prestressed away from the connection region by a spring, said tension body having a projecting tenon for deflecting and guiding back the resistance wire.

The connection between the half shells and the contact base can be made very simple, because after assembly the junction piece holds all the components together, if the contact base has in its outer surface, on the side facing the two half shells, a peripheral groove, into which the respective connection region of the half shells engages with a radially inward-directed collar.

When the sensor is intended to be screwed from above in a vertical orientation, for example into an oil sump, then, for this purpose, there may be provision for the half shell intended for temperature measurement to have, in its lower end face, an outwardly open recess for a sensor element responding to temperature. What is achieved thereby is that the sensor element responding to temperature is always located in the region of the lowest point of the oil sump, so that it is always immersed in oil.

It is also possible, however, to design the sensor in such a way that it projects vertically from below into the oil sump or into a tank containing the medium to be measured, if the half shell intended for temperature measurement has in its outer surface, near the junction piece, an outwardly open recess for a sensor element responding to temperature.

BRIEF DESCRIPTION OF THE DRAWINGS

The invention permits various embodiments. To make its basic principle even clearer, two of these are illustrated in the drawing and are described below. In the drawing:

FIG. 1 shows a vertical section through a complete sensor according to the invention;

FIG. 2 shows a vertical section through the sensor without a half shell intended for temperature measurement;

Figure 3:
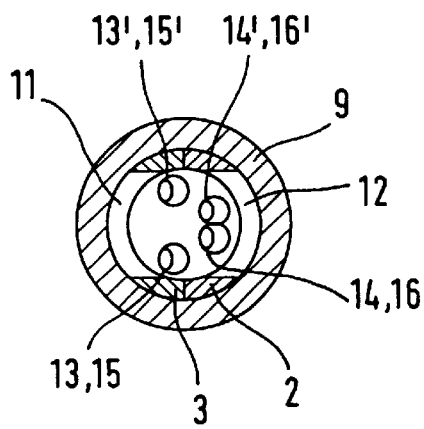
FIG. 3 shows a cross section through the sensor according to FIG. 1 along the line III—III in FIG. 1.

As can be seen from FIG. 1, the sensor has a plastic housing 1 which is formed from two half shells 2, 3. These two half shells 2, 3 each have, in the upper region, a connection region 4, 5 of enlarged diameter, which near its upper end engages with an inwardly directed collar 6 into a peripheral groove 7 of a contact base 8. The housing 1 is inserted, together with the contact base 8, into a junction piece 9 which is provided on the outside with a screw-in thread 10.

It can also be seen from FIG. 1 that each connection region 4, 5 has a radial perforation 11, 12. Pairs of electrical conductors 13, 14 project from the contact base 8 and pairs of electrical conductors 15, 16 from the housing 1 into the region of these perforations 11, 12 and are connected to one another there by means of welds 17.

Located in the half shell 3 designed for level measurement, near the lower end of the latter, is a tension body 18 which is held in the half shell 3 so as to be displaceable therein in the longitudinal direction and which is prestressed away from the connection region 4 by a spring 19. This tension body 18 has a tenon 20, by means of which a resistance wire 21 is deflected through 180°, said resistance wire running in the half shell 3 over a substantial region of its length and being connected to the two conductors 15. Current flows through this resistance wire 21 during level measurement. It is cooled to a greater or lesser extent, as a function of the filling level, by the medium to be measured, so that its total electrical resistance changes correspondingly and the filling level can thereby be determined electrically.

The half shell 2 has in its lower end face a recess 22 with a sensor element 23 responding to temperature, for example an NTC element or a PTC element. This is connected to the conductor 16 and can thereby generate temperature signals.

FIG. 2 shows the half shell 3 rotated through 90° in relation to FIG. 1. The tension body 18 with the tenon 20, which deflects the resistance wire 21, can be seen again. It can be seen that the resistance wire 21 runs in a U-shaped manner, its two regions which in each case form a leg of the U being designated by 21' and 21" in FIG. 2.

FIG. 3 shows, within the junction piece 9, regions of the half shells 2 and 3, with the respective perforations 11, 12, and the conductors 13, 15 and 14, 16 which meet one another and are welded to one another there. The conductors 13', 15' and 14', 16' which cannot be seen in FIG. 1 can also be seen.

Figure 4:
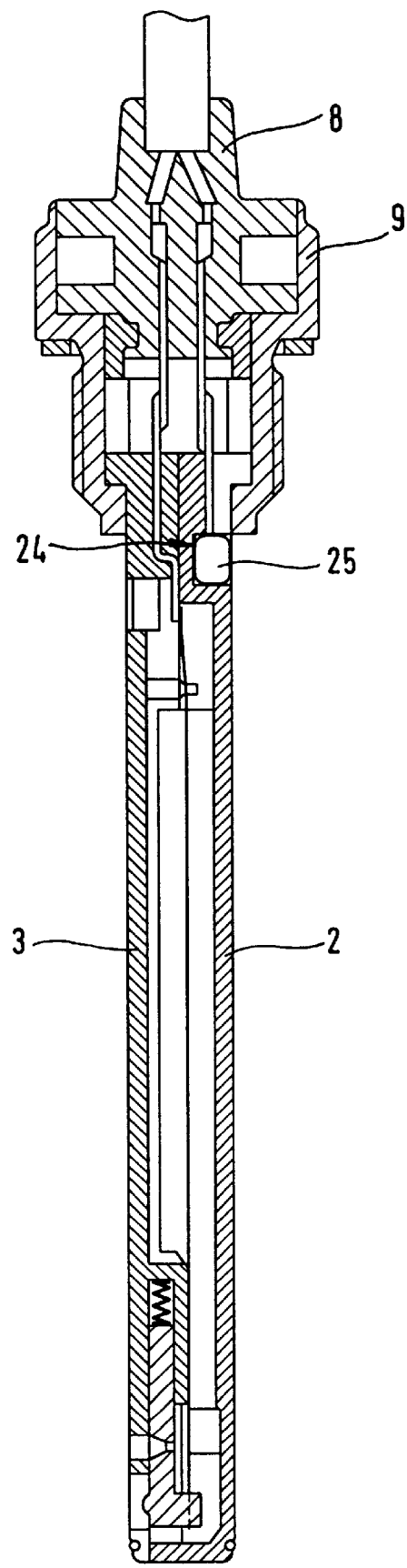
FIG. 4 shows a vertical section through a second embodiment of the sensor.

The embodiment according to FIG. 4 differs from that according to FIG. 1 in that a recess 24 with a sensor element 25 responding to temperature is located, near the junction piece 9, in the outer surface of the half shell 2. The sensor according to FIG. 4 is designed to be installed in an oil sump from its underside. Where such installation is concerned, the sensor element 25 is located near the lowest point of the oil sump.

For assembling the sensor according to the invention, first all the installation parts are installed in the two half shells 2, 3 and the contact base 8. One half shell 2, 3 is then welded to the contact base 8 and subsequently the other half shell 2, 3 is connected to the first half shell 2, 3, for example by snapping, welding, caulking or clamping. It is thereafter likewise welded to the contact base 8. During final assembly, the unit is inserted into the junction piece 9, which has integrated sealing disks, and is subsequently rolled shut.

What is claimed is:

1. A sensor for determining the level and temperature of a liquid in a motor vehicle engine comprising:
   (a) an elongate housing constructed of first and second mating half shells;
   (b) operating components disposed within one of the mating half shells to effectuate measurement of liquid level within the vehicle engine;
   (c) operating components disposed within the other one of the mating half shells to effectuate measurement of the temperature of the fluid within the vehicle engine; and
   (d) a tension body arranged in the half shell for the components required for fluid level measurement so as to be displaceable in the main direction of extent of the half shell and so as to be prestressed away from an electrical connection region by a spring, the tension body having a projecting tenon for deflecting and guiding back a resistance wire.

2. A sensor for determining the level and temperature of a liquid in a motor vehicle engine comprising:
   (a) an elongated housing constructed of first and second mating half shells;
   (b) operating components disposed within one of the mating half shells to effectuate measurement of liquid level within the vehicle engine;
   (c) operating components disposed within the other one of the mating half shells to effectuate measurement of the fluid temperature within the vehicle engine;
   (d) an enlarged connection structure located in the upper regions of the joined half shells;
   (e) a radial perforation extending through the enlarged connection structure of each half shell;
   (f) a contact base operably secured to the connection structure; and
   (g) electrical conductors from the operating components and from the contact base, which conductors are operably connected to each other in the region of the perforations.

3. The sensor as claimed in claim 2, wherein the conductors are connected to one another, in each case means of a weld, in the region of the perforations.

4. The sensor as claimed in at least one of the preceding claims, wherein a connection region of the two half shells to the contact base is inserted into a junction piece.

5. The sensor as claimed in claim 1 or 2, wherein the contact base has in its outer surface, on the side facing the two half shells, a peripheral groove, into which the respective connection region of the half shells engages with a radially inward-directed collar.

\* \* \* \* \*